United States Patent

Mays

Patent Number: 5,105,573
Date of Patent: Apr. 21, 1992

[54] ELECTRICALLY ANIMATED FISHING LURE

[76] Inventor: Ralph C. Mays, 6740 S. 69th East Ave., Tulsa, Okla. 74133

[21] Appl. No.: 598,028

[22] Filed: Oct. 16, 1990

[51] Int. Cl.⁵ .............................................. A01K 79/02
[52] U.S. Cl. ......................... 43/17.1; 43/26.2; 43/42.06
[58] Field of Search ............... 43/42.06, 26.1, 26.2, 43/17.1

[56] References Cited

U.S. PATENT DOCUMENTS

| | | | |
|---|---|---|---|
| 726,020 | 4/1903 | Bryan | 42/26.2 |
| 1,401,096 | 12/1921 | Neudeck | 43/19.2 |
| 1,906,791 | 4/1932 | Grossmann | 43/26.2 |
| 1,989,460 | 5/1933 | Porter | 43/42 |
| 2,244,032 | 6/1941 | Timm | 43/48 |
| 2,448,523 | 11/1948 | Fibiger | 43/43 |
| 2,550,988 | 9/1948 | Flournoy | 43/17.6 |
| 2,559,475 | 5/1946 | Sparkman | 43/26.2 |
| 2,655,757 | 11/1948 | Boyce | 43/26.2 |
| 2,833,216 | 5/1958 | Rommel | 43/26.2 |
| 2,909,868 | 10/1959 | Lewis | 43/26.2 |
| 3,045,381 | 5/1960 | Martin | 43/26.2 |
| 3,085,361 | 12/1960 | Rhodes | 43/26.2 |
| 3,235,999 | 12/1964 | Wieszeck | 43/17.1 |
| 3,715,830 | 2/1971 | Price | 43/26.2 |
| 3,841,012 | 10/1974 | Maled | 43/26.2 |
| 4,098,017 | 7/1978 | Hall | 43/42.06 |
| 4,232,469 | 11/1980 | Shiverdecker | 43/42.27 |
| 4,442,621 | 4/1984 | Kent | 43/26.1 |
| 4,536,985 | 8/1985 | Caviness | 43/17.6 |
| 4,581,841 | 4/1986 | Gish | 43/26.2 |
| 4,594,806 | 6/1986 | Brown | 43/42.18 |
| 4,811,515 | 3/1989 | D'Aquino | 43/26.1 |
| 4,831,767 | 5/1989 | Pearce | 43/26.2 |

Primary Examiner—Kurt Rowan
Assistant Examiner—Chuck Y. Mah
Attorney, Agent, or Firm—Head and Johnson

[57] ABSTRACT

An electrically animated fishing lure having a lure body, a motor retained by the body, a propulsion means driven by the motor whereby when the motor is energized the lure is caused to move on or through water, the lure being arranged to travel in a non-linear path, and an electrical conductor extending with a fishing line by which electrical energy is provided to the motor. The characteristic of the lure moving in a non-linear path permits a fisherman to control the movement of the lure in and around obstructions in the water being fished. The preferred propulsion means includes the use of oppositely extending rotating wings, one of the wings being configured to provide greater propulsion than the other and in another embodiment a flow cavity is provided having jets extending to each side of the lure, one of the jets providing greater thrust than the other.

20 Claims, 3 Drawing Sheets

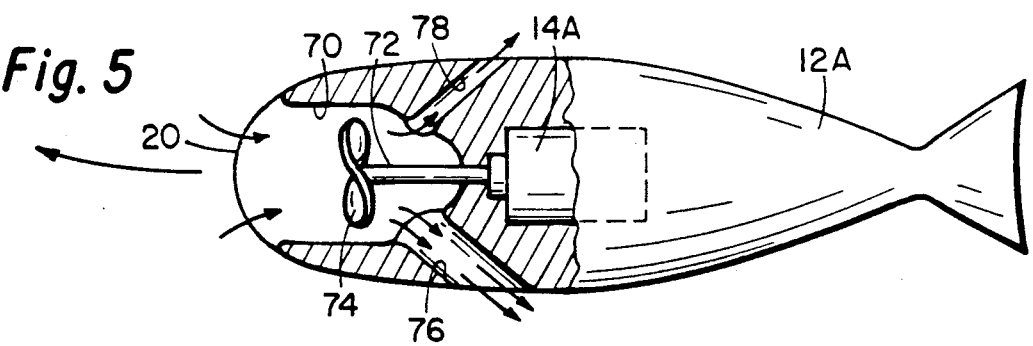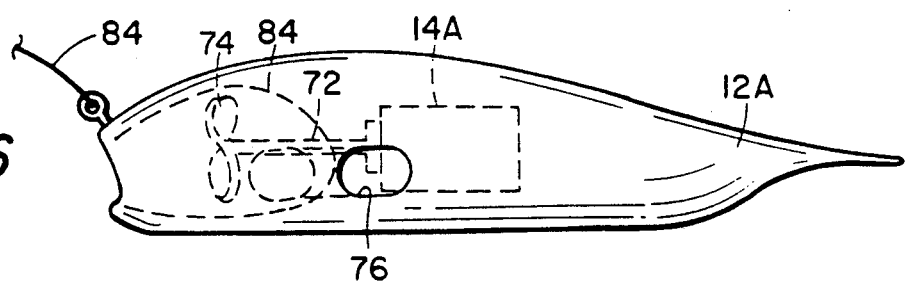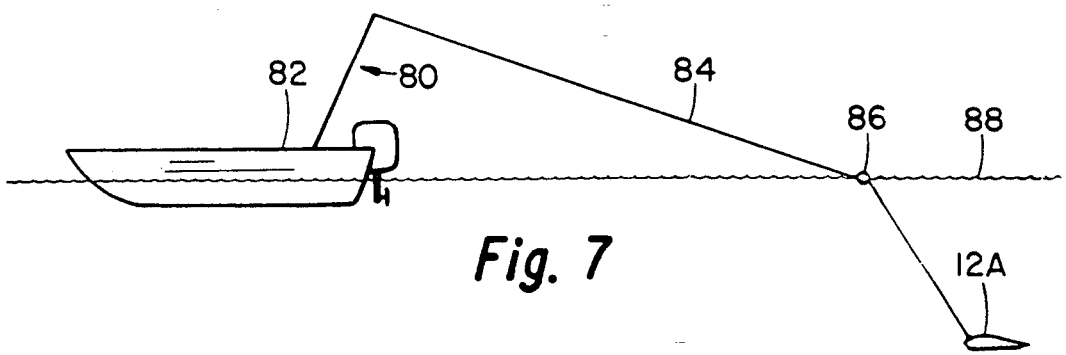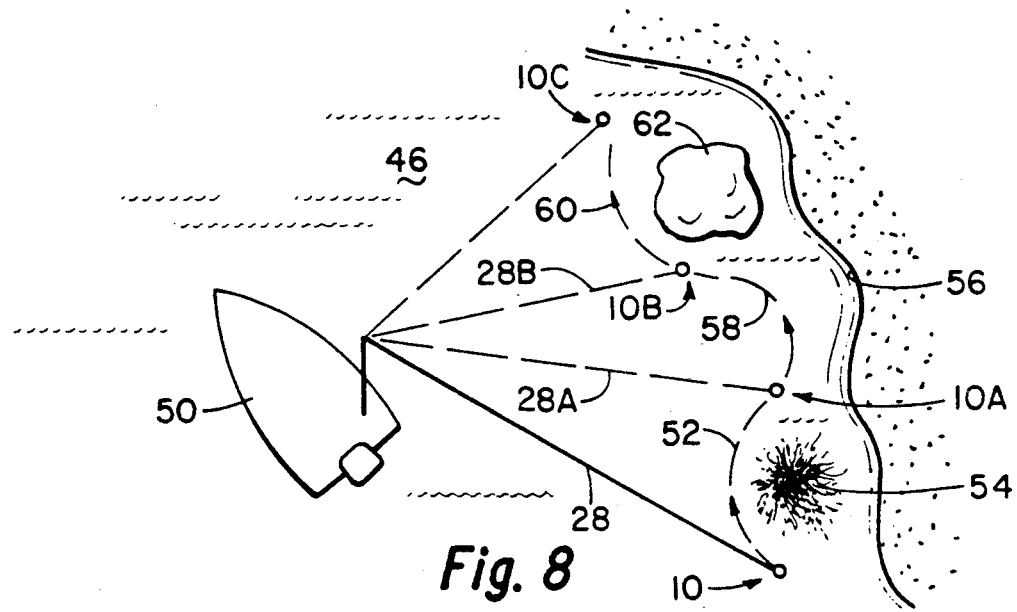

ELECTRICALLY ANIMATED FISHING LURE

BACKGROUND OF THE INVENTION

One of the most popular activities in the United States and many other countries of the world is that of fishing. While fishing can be practiced in many ways, the method preferred by active sport freshwater fishermen is that of casting artificial lures using a rod and reel. In cast fishing, the fisherman first winds line on a reel to place the lure adjacent the end of a fishing rod. By whip-like action of the fishing rod, with simultaneous release of tension on the line, the lure can be cast to a considerable distance. The fisherman then retrieves the lure by winding line onto the reel. Lures are typically constructed so that their aqua dynamics cause the lure to imitate a swimming fish, frogs, insects or other natural food sources of game fish.

In order to increase fishing lure animation, the use of electrical energy has been suggested. For reference to electrically actuated or animated fishing lures see the following U.S. Pat. Nos.: 726,022; 1,401,096; 1,906,791; 1,989,460; 2,244,032; 2,448,523; 2,550,988; 2,559,475; 2,655,757; 3,045,381; 3,085,361; 3,235,999; 3,715,830; 3,841,012; 4,232,469; 4,594,806; 4,831,767 and 4,536,985.

Existing fishing lures, including electrically activated ones such as disclosed in the above U.S. patents, do not provide effective means for maneuvering a lure after it has been cast. It is well known that many species of fish tend to habitually seek cover and therefore congregate around rocks, brush, overhanging limbs and so forth. A problem experienced by all sport fishermen is placing the lure in a position that will be most likely to attract a game fish. The present invention overcomes the limitation of known types of electrically animated fishing lures by providing a lure which is, to a considerable degree, maneuverable by the fisherman.

SUMMARY OF THE INVENTION

This invention relates to an electrically animated fishing lure. The lure includes a body which may be either floatable, that is, which travels on the surface of the water or submersible, which travels below the water's surface. The body includes an electric motor that drives a propulsion system. In one embodiment where the lure is of the flotation type, the propulsion system is in the form of oppositely extending wings that, upon rotation, contact the surface of the water and propel the lure along on top of the surface in a non-linear path. In another embodiment, particularly applicable for an underwater lure, a motor drives a propeller that pulls water into a passageway within the lure and expels the water to either side of the lure by means of jet openings and in which one of the jet openings provides greater propulsion force than the other. Thus, in the preferred embodiment of the fishing lure, whether the flotation or the submersible type, the lure preferably is devised to move by the application of electrical energy on or through the water in a non-linear path.

A lure which travels in a non-linear path permits a fisherman to, within limits, manoeuver a lure after it is cast into the water.

Another feature of the invention is improved animation. The lure body has flexible legs which are engaged by rotating wings or other elements of the propulsion system to cause the legs to repeatedly deflect and therefore to provide the illusion of a living creature.

A better understanding of the invention will be had by reference to the following descriptions and claims, taken in conjunction with the attached drawings.

DESCRIPTION OF THE DRAWINGS

In FIGS. 1, 2 and 3 the lure body has flexible leg members extending therefrom and the wing members or rod members are arranged to repeatedly engage the leg members and cause them to deflect.

FIG. 5 is a top, partially cut away, view of an alternate embodiment of an electrically animated fishing lure in which a passageway is provided within the lure body and an electric motor drives a propeller forcing expulsion of water through jets which extend to opposite sides of the lure and in which one jet provides more propulsion force than the other.

FIG. 6 is an elevational view of the embodiment of FIG. 5. The lure shown in FIGS. 5 and 6 is without fishhooks, it being understood that fishhooks are always used on fishing lures.

FIG. 7 shows diagrammatically a boat on the water and a fishing pole extending therefrom with a fishing line having a float and showing a submersible lure which may be of the type shown in FIGS. 5 and 6.

FIG. 8 is a top view diagrammatically showing how a fisherman can, by alternately retrieving the fishing line or allowing slack, can control, to a limited extent, the movement of the lure in or on the water in which it is cast.

DESCRIPTION OF THE PREFERRED EMBODIMENT

Figure 1:
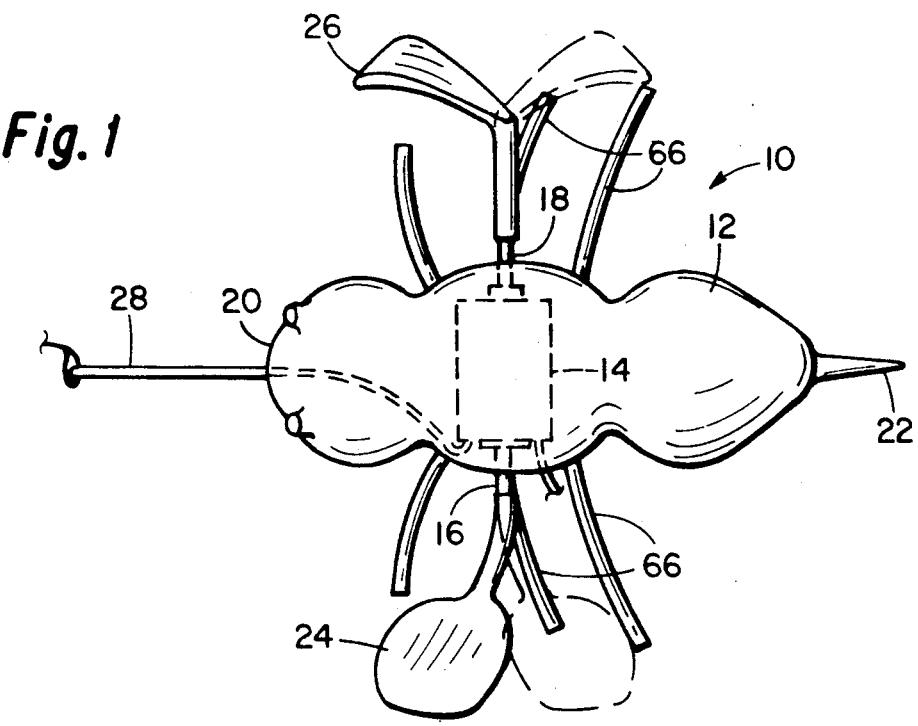
FIG. 1 is top view of a fishing lure embodying the principles of this invention. In this embodiment a motor is employed in the lure body having oppositely extending shafts which rotate about a common axis and in which propulsion is provided by wings attached to the shafts.
Figure 2:
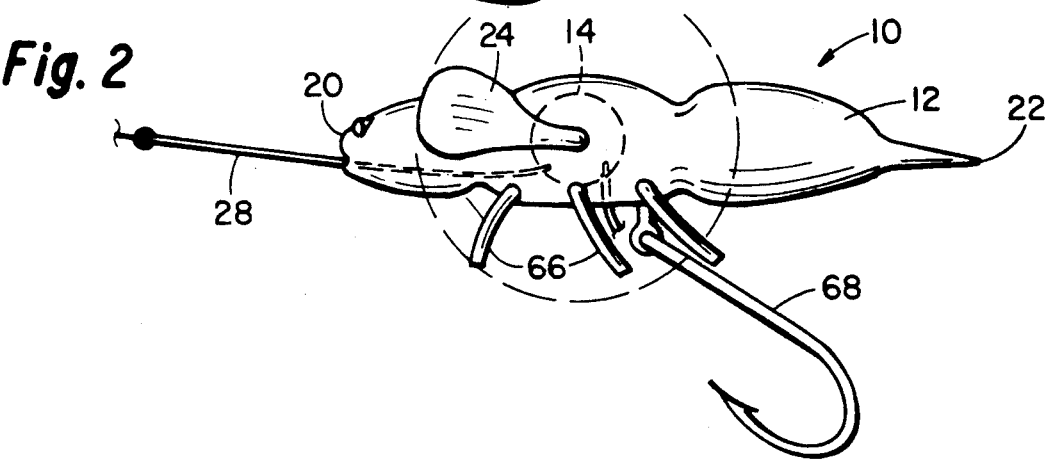
FIG. 2 is an elevational side view of the electrically animated fishing lure of FIG. 1.

Referring to the drawings and first to FIGS. 1 and 2, an embodiment of the invention is illustrated. A fishing lure is generally indicated by the numeral 10 and includes a body 12 which may be made of wood, plastic or the like. The lure illustrated in FIGS. 1 and 2 is preferably of the floatable type, that is, the lure weighs less than the water it displaces so that it floats on the water's surface. Positioned within the lure is an electric motor 14 having a first shaft 16 extending to the left side of the lure and a second shaft 18 extending to the right side of the lure. The front of the lure is indicated by the numeral 20 and the tail of the lure by the numeral 22. Shafts 16 and 18 extend co-axially from the motor. Motors with double shafts are commercially available.

A wing member 24 is affixed to first shaft 16 and in like manner, a right wing member 26 is affixed to the second shaft 18. The shape of the wings vary, but in the preferred arrangement one of the wing members is configured to produce more propulsion force than the other. Upon energization of motor 14 the wing members rotate. During part of each revolution each wing rotates essentially below the water's surface and the other part of each revolution each wing rotates essentially above the water's surface in a paddle-wheel arrangement to thereby provide propulsion of the lure.

Wings 24 and 26 provide a thrashing action on the water when motor 14 is actuated, simulating the action of a non-aquatic creature attempting to escape from the water's surface. This type of action simulates that of natural occurring food sources of game fish.

The fishing lure body 12 has a fishing line 28 attached to it. Fishing line 28 is in the form of an electrical conductor or has therewith or therein an electrical conductor. Thus, fishing line 28 provides two functions, that is, it physically attaches the lure body 12 to a fishing rod controlled by a fisherman and it provides eletrical energy to motor 14.

Figure 9:
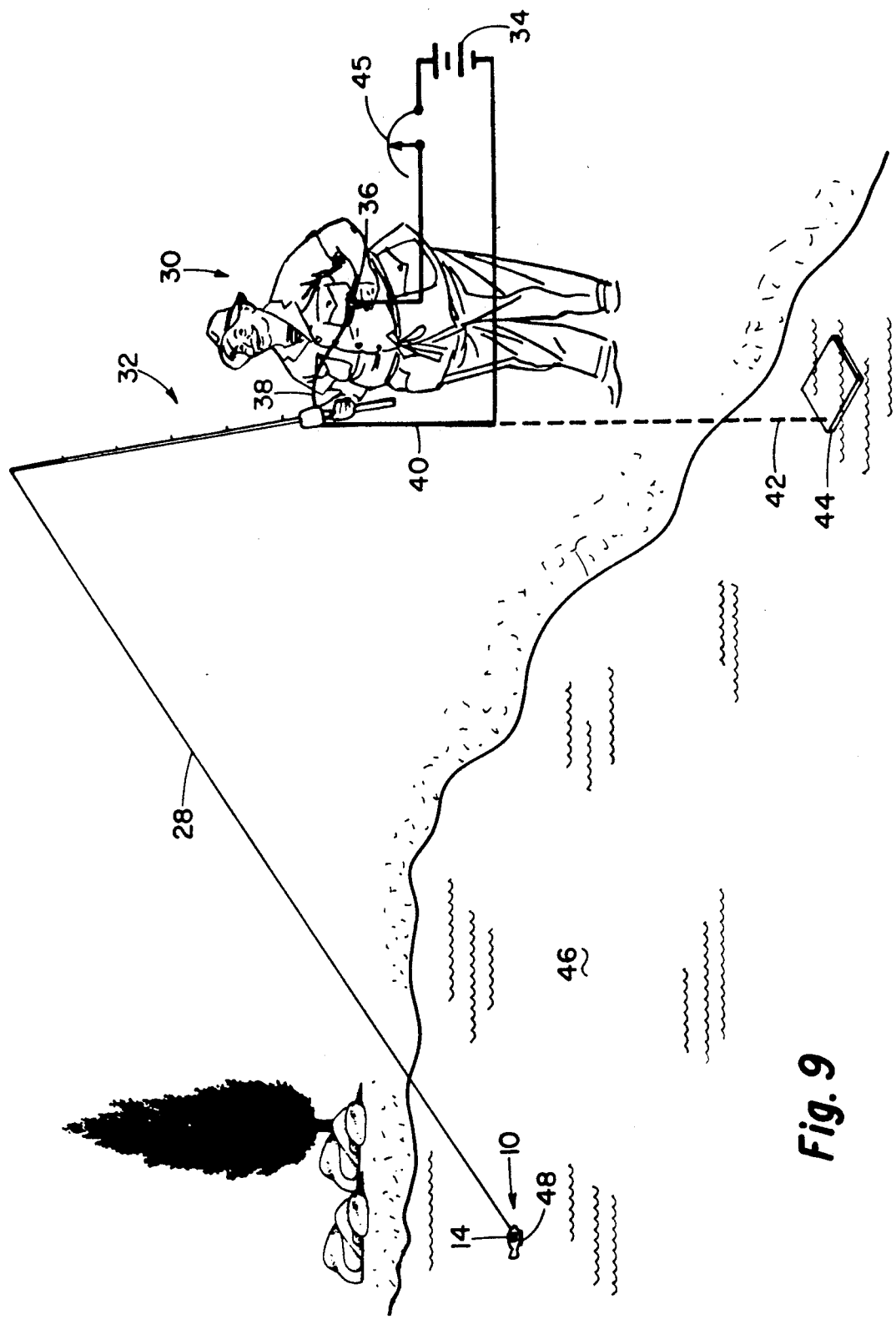
FIG. 9 is a diagrammatic view showing how electrical energy is applied to the animated fishing lure of this disclosure.

FIG. 9 is a diagrammatic example of a method of providing electrical energy to lure 10. In FIG. 9 a fisherman 30 holds a rod and reel 32. A voltage source, such as a battery 34, provides electrical energy through an on/off switch 36 to a conductor 38 extending to the fishing rod and reel, and from thence to the fishing line 28. Switch 36 is illustrated for purposes of clarity as separate from the rod and reel 32, however, the switch can easily be affixed to the fishing rod to be operated by the same hand of the fisherman that holds the fishing rod. Also extending from the battery 34 is a second conductor 40 which extends to the rod and reel 32. In this arrangement as shown in solid outline and wherein the conductors are shown in solid line, the fishing line 28 is a two conductor line and provides a complete circuit with motor 14 when switch 36 is closed. In an alternate arrangement, one pole of voltage source 34 is connected by a conductor 42, shown in dotted line, to a plate 44 or other conductive device placed in contact with the water 46. Lure 10 has an electrical conductor 48 on at least part of the exterior surface thereof. Metal conductor 48 is connected to motor 14. Thus, when the alternate conductor 42 is employed the second conductor 40 to the rod and reel is not employed, and the fishing line may then be or include a single conductor with current flow through the water completing the circuit. Whether electrical energy is supplied by a single or double electrical conductive fishing line 28 does not change the basic method of operating fishing lure 10.

In the illustrated arrangement a control device 45 is in the circuit providing means of controlling the voltage or current flow to lure 10 as a means of regulating the speed of motor 14. By adjustment of control 45 the speed of action and rate of propulsion of the lure can be selected by the fisherman. Speed control 45 may include the use of SCR's or other solid state devices.

Referring to FIG. 8, the advantages of the lure of FIGS. 1 and 2 can be best understood. From a boat 50 on the surface of water 46 a fisherman has cast lure 10 to the lower-most position. The lure is electrically actuated by closing switch 36 (FIG. 9) causing motor 14 to rotate. Lure 10 moves in a forward direction but in a non-linear path 52 since the left wing 24 (FIG. 1) is configured to provide greater propulsion. The lure moves in a circular clockwise path as indicated by the numeral 52. During this movement, if the fisherman allows slack in line 28, the lure will move to the position 10A. The circuitous counterclockwise path 52 causes the lure to move around brush 54 in water 46. If the lure is permitted to continue on path 52 it would engage the shore line 56. This is prevented by the fisherman reeling in the fishing line indicated at 28A. At this time, the lure can be de-actuated, that is, by opening switch 36 (FIG. 9) or the lure can continue to be actuated, but the force of the line is obviously greater than the propulsion of the reel so that the lure is pulled toward the fisherman. In the illustration of FIG. 8 it is assumed that the lure is continually energized and the fisherman gradually reels line in at 28A, causing the path 58 to be followed to the point where the lure is at 10B. At this point the fishing line 28B may again be given slack, permitting the lure to move in a clockwise direction, as indicated by the path 60, to cause the lure to move to the position 10C. Path 60 causes the lure to move around an object, such as a rock 62. This sequence illustrates how the movement of the lure on the surface of the water can be controlled, within a limited extent by the fisherman.

Figure 3:
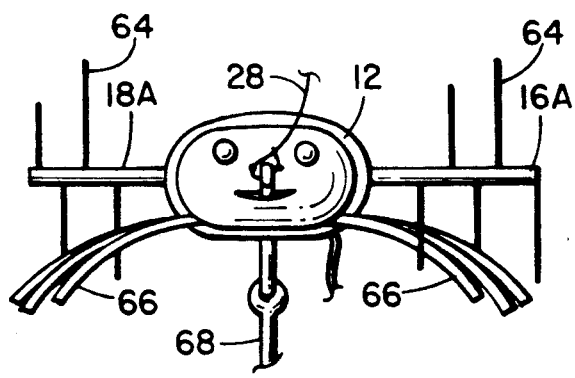
FIG. 3 is a front view of an alternate embodiment wherein the wings are replaced by rod members extending from the shafts.
Figure 4:
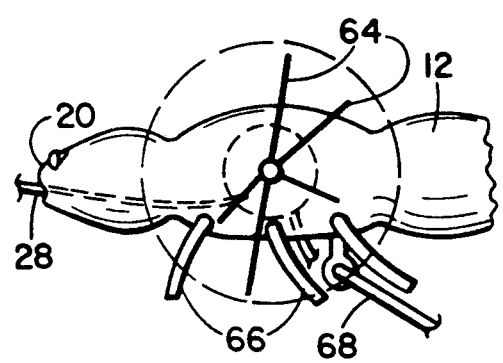
FIG. 4 is an elevational view side, partially cut away, of the lure of FIG. 3.

FIGS. 3 and 4 show another embodiment of the lure. In this embodiment, the motor shafts 16A and 18A (or extensions of the motor shafts) are in the form of generally radially extending wire portions 64. These wires or fibrous members function in paddle-wheel fashion the same as wings 24 and 26 described with reference to FIGS. 1 and 2. In the preferred arrangement more wires 64 are used on shaft 16A than on shaft 18A to provide more propulsion so the lure moves, when the motor is energized, in a non-linear path.

The lure body in FIGS. 3 and 4 is shown with a plurality (total of six) leg members 66 extending three from each side. These leg members may be formed of plastic. The wings 24 and 26 of FIGS. 1 and 2 and the wire members 64 of FIGS. 3 and 4, when rotated, engage these flexible legs 66 causing them to deflect. Deflection of the legs is not directly concerned with propulsion of the lure but serves to increase the animation thereof.

As is typical of all fishing lures, the lure of FIGS. 1, 2 and 3 has a hook 68 extending from it. The hook can be arranged in various ways on the lure body and more than one hook may be employed.

FIGS. 5 and 6 show an embodiment of the lure having a different propulsion system. In this system the lure body 12A has a cavity 70 in the forward portion thereof, the cavity communicating with the body front end 20. Motor 14A has a single shaft 72 extending from it and the motor is arranged in a different orientation, that is, with the shaft 72 extending generally in a plane parallel to that of the longitudinal axis of lure body 12A. Affixed to the forward end of the shaft is a propeller 74 which is rotated within cavity 70.

Formed in lure body 12A is a first water outlet passageway 76, one end of which communicates with cavity 70, and the other end to one side of the body 12A rearwardly of the cavity. A second water outlet passageway 78 communicates between cavity 70 and the opposite side of the lure body. First passageway 76 is of larger internal diameter than passageway 78 so that more water is expelled through when propeller 74 is rotated. The rearward expulsion of water through the outlets 76 and 78 propels the lure body 12A in the water. By the provision wherein one of the passageways provides greater propulsion force, the lure body will tend to travel in a non-linear path in the same way as described with reference to FIGS. 1 and 2.

The lure of FIGS. 5 and 6 can be of the floating type as long as at least a portion of the inlet to cavity 70 is below water when the lure floats on the surface of the water. Alternatively, the lure of FIGS. 5 and 6 can be of the submersible type, that is, the entire lure body is heavier than water and sinks. FIG. 7 shows the use of a submersible lure body that employs the principles of this invention. In FIG. 7 a fishing rod 80 is shown as useds by a fisherman in a boat 82 (the fisherman not being shown) and with a fishing line 84 extending from the fishing rod. The lure body 12A is affixed to the end of fishing line 84. To control the depth of the lure, a float 86 on water surface 88 may be employed as illustrated.

If boat 82 is stationary in the arrangement of FIGS. 5 and 6, lure body 12A can be caused to move in a circular path around the vertical axis through float 86 or, by reeling in or letting out the fishing line 84, the fisherman can control, to a limited extent, the path of lure body 12A as it travels in a non-linear path below the water's surface.

The lure body 12A of FIGS. 5 and 6 is shown without a hook, although it is understood that one or more hooks would be employed. Further, the external configuration of the lure body is variable in great detail and is not limited to the arrangement illustrated. The fishing line 84, as shown in FIG. 6, provides electrical current flow, as previously described with reference to fishing line 28 of FIGS. 1 and 2, to energize motor 14A.

The unique fishing lure thus described provides movement and animation, and provides means whereby the fisherman can exercise limited control over the movement of the fishing lure in the water so as to increase the chance of effectiveness of the fishing lure to attract fish.

An important feature of the fishing lure of this disclosure is the provision of an animated lure that moves in a non-linear path. This is preferably achieved by the use of a propulsion system that provides more propulsion on one side of the lure body than on the opposite side. Another method of achieving a non-linear movement includes the use of a propulsion system that is substantially symmetrical but in which the lure body is configured to provide a turning action, much like a rudder provides turning action for a boat.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An electrically animated fishing lure comprising:
   a lure body;
   a motor retained by said body the motor having oppositely extending first and second shafts;
   propulsion means driven by said motor in the form of a first wing member affixed to said first shaft and a second wing member affixed to said second shaft; and
   means of conducting electrical energy to said motor.

2. An electrically animated fishing lure according to claim 1 wherein said first wing member has greater propulsion force than said second wing member.

3. An electrically animated fishing lure according to claim 1 wherein said means of conducting electrical energy to said motor includes an electrically conductive fishing line.

4. An electrically animated fishing lure according to claim 1 including flexible leg members extending from said body, at least one of which leg members is contacted by a said wing member as said wing member is rotated.

5. An electrically animated fishing lure according to claim 1 wherein said lure body is elongated and said motor shafts have a common axis that is generally perpendicular to the body longitudinal axis and wherein said body has a specific gravity causing the body to float on the surface of water to a depth substantially that of said motor shafts common axis and wherein said first and second wing members are rotated in a manner in which each wing is above water during part of each revolution and below water during part of each revolution.

6. An electrically animated fishing lure according to claim 1 including means of controlling the speed of said motor.

7. An electrically animated fishing lure comprising:
   a lure body having a flow cavity therein providing a water inlet passageway and at least one water outlet passageway;
   a motor retained by said body;
   a propeller in said flow cavity rotated by said motor to move water through said water inlet passageway and out through said at least one water outlet passageway to provide propulsion means;
   means of conducting electrical energy to said motor; and
   means causing said lure body when in or on water and actuated by said propulsion means, to move in a non-linear path.

8. An electrically animated fishing lure according to claim 7 wherein said lure body has first and second water outlet passageways oriented to opposite sides of said lure body, said first water outlet passageway configured to provide greater propulsion than said second water outlet passageway to thereby provide said means of causing said lure body to move in a non-linear path.

9. An electrically animated fishing lure, comprising:
   an elongated lure body having a longitudinal axis;
   a motor supported by said body having oppositely extending shafts rotational about a common axis that is substantially perpendicular to said body longitudinal axis;
   a wing member affixed to and rotatable by each of said shafts exteriorly of said body; and
   means of supplying electrical energy to said motor.

10. An electrically animated fishing lure according to claim 9 including means when said wings are rotated by said motor to cause said lure to be propelled when in water.

11. An electrically animated fishing lure according to claim 9 wherein said means of conducting electrical energy to said motor includes an electrically conductive fishing line.

12. An electrically animated fishing lure according to claim 9 including flexible leg members extending from said body, at least one of which leg members is contacted by a said wing member as said wing member is rotated.

13. An electrically animated fishing lure according to claim 9 wherein said body has a specific gravity causing the body to float on the surface of water to a depth substantially that of said motor shafts common axis and wherein said wing members are rotated in a manner in which each wing is above water during part of each revolution and below water during part of each revolution.

14. An electrically animated fishing lure according to claim 9 including means of controlling the speed of rotation of said motor.

15. An electrically animated fishing lure comprising:
an elongated lure body having a longitudinal axis, the body having a flow cavity therein, a water inlet passageway communicating with the flow cavity and at least one water outlet passageway communicating with the flow cavity;
a motor positioned within said lure body, the motor having a shaft extending therefrom, the axis of said shaft being parallel to said longitudinal axis of said lure body;
a propeller affixed to said shaft within said flow cavity; and
means of supplying electrical energy to said motor to rotate said propeller to propel said lure body in water by the ejection of water through said water outlet.

16. An electrically animated fishing lure according to claim 15 wherein said lure body has first and second water outlet passageways oriented to opposite sides of said lure body, one of said first water outlet passageway configured to provide greater propulsion than said second water outlet passageway to thereby provide said means of causing said lure body to move in a non-linear path.

17. An electrically animated fishing lure according to claim 15 wherein said means of conducting electrical energy to said motor includes an electrically conductive fishing line.

18. An electrically animated fishing lure according to claim 15 wherein said water outlet passageway is configured such that when said water is expelled therethrough, said lure body is propelled in a non-linear path.

19. An electrically animated fishing lure according to claim 15 wherein the specific gravity of said lure body is heavier than water.

20. An electrically animated fishing lure according to claim 15 including means of controlling the speed of said motor.

* * * * *